(12) United States Patent
Segiet et al.

(10) Patent No.: US 12,291,443 B2
(45) Date of Patent: *May 6, 2025

(54) BEVERAGE DISPENSE VALVE CONTROLLED BY WIRELESS TECHNOLOGY

(71) Applicant: PepsiCo, Inc., Purchase, NY (US)

(72) Inventors: William W. Segiet, Bethel, CT (US);
Alex L. Gray, Valhalla, NY (US);
Fernando A. Ubidia, Ludlow, MA (US); Aaron M. Stein, Ludlow, MA (US); John F. Lewis, Ludlow, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,116

(22) Filed: May 24, 2023

(65) Prior Publication Data

US 2023/0406688 A1 Dec. 21, 2023

Related U.S. Application Data

(63) Continuation of application No. 16/435,873, filed on Jun. 10, 2019, now abandoned, which is a
(Continued)

(51) Int. Cl.
*B67D 1/08* (2006.01)
*B67D 1/12* (2006.01)
(Continued)

(52) U.S. Cl.
CPC ......... *B67D 1/0888* (2013.01); *B67D 1/0882* (2013.01); *B67D 1/0894* (2013.01);
(Continued)

(58) Field of Classification Search
CPC .. B67D 1/0882; B67D 1/0888; B67D 1/0894; B67D 1/1279; B67D 2001/0811;
(Continued)

(56) References Cited

U.S. PATENT DOCUMENTS

| 4,186,381 A | 1/1980 | Fleischer |
| 4,463,706 A | 8/1984 | Meister et al. |

(Continued)

FOREIGN PATENT DOCUMENTS

| WO | WO 9732284 A1 | 9/1997 |
| WO | WO 9945305 A1 | 9/1999 |

(Continued)

*Primary Examiner* — Timothy L Maust
(74) *Attorney, Agent, or Firm* — Sterne, Kessler, Goldstein & Fox P.L.L.C.

(57) ABSTRACT

Methods and systems directed to dispensing fluids, such as beverages, using wireless technology are provided. Aspects relate to a beverage dispenser with a dispensing system housing, a valve housing positioned exterior to the dispensing system housing and extending from the dispensing system housing. The valve housing may be configured to dispense a beverage and include self-contained electronics disposed within an interior area of the valve housing. In some embodiments, the beverage dispenser has one or more additional valve housings positioned exterior to the dispensing system housing. The valve housing may be configured to dispense a beverage and include self-contained electronics disposed within an interior area of the valve housing.

13 Claims, 5 Drawing Sheets

Related U.S. Application Data continuation of application No. 15/624,149, filed on Jun. 15, 2017, now Pat. No. 10,315,907, which is a continuation of application No. 14/968,101, filed on Dec. 14, 2015, now Pat. No. 9,708,170, which is a continuation of application No. 14/528,695, filed on Oct. 30, 2014, now Pat. No. 9,212,040, which is a continuation of application No. 12/704,217, filed on Feb. 11, 2010, now Pat. No. 8,910,674.

(60) Provisional application No. 61/151,770, filed on Feb. 11, 2009.

(51) Int. Cl.
- B67D 3/00 (2006.01)
- G06Q 20/32 (2012.01)
- G07F 13/02 (2006.01)
- G07F 13/06 (2006.01)
- G07F 13/10 (2006.01)

(52) U.S. Cl.
CPC ......... *B67D 1/1279* (2013.01); *B67D 3/0074* (2013.01); *B67D 3/0077* (2013.01); *G06Q 20/3278* (2013.01); *G07F 13/025* (2013.01); *G07F 13/065* (2013.01); *G07F 13/10* (2013.01); *B67D 2001/0811* (2013.01); *H04Q 2213/13095* (2013.01)

(58) Field of Classification Search
CPC .............. B67D 3/0074; B67D 3/0077; G06Q 20/3278; G07F 13/025; G07F 13/065; G07F 13/10; H04Q 2213/13095
See application file for complete search history.

(56) References Cited

U.S. PATENT DOCUMENTS

| | | |
|---|---|---|
| 4,469,149 A | 9/1984 | Walkey et al. |
| 4,929,818 A | 5/1990 | Bradbury et al. |
| 5,392,049 A | 2/1995 | Gunnarsson |
| 5,566,732 A * | 10/1996 | Nelson ................ B67D 1/1236 141/351 |
| 5,596,501 A | 1/1997 | Comer et al. |
| 5,605,182 A | 2/1997 | Oberrecht et al. |
| 5,628,351 A | 5/1997 | Ramsey, Jr. et al. |
| 5,700,999 A | 12/1997 | Streicher et al. |
| 5,722,469 A | 3/1998 | Tuminaro |
| 5,729,002 A | 3/1998 | Samples |
| 5,757,664 A | 5/1998 | Rogers et al. |
| 5,862,222 A | 1/1999 | Gunnarsson |
| 5,890,520 A | 4/1999 | Johnson, Jr. |
| 5,906,228 A | 5/1999 | Keller |
| 5,913,180 A | 6/1999 | Ryan |
| 5,956,259 A | 9/1999 | Hartsell, Jr. et al. |
| 5,969,691 A | 10/1999 | Myers |
| 6,002,343 A | 12/1999 | Auerbach et al. |
| 6,024,142 A | 2/2000 | Bates |
| 6,032,703 A | 3/2000 | Baker et al. |
| 6,078,888 A | 6/2000 | Johnson, Jr. |
| 6,089,284 A | 7/2000 | Kaehler et al. |
| 6,112,981 A | 9/2000 | McCall |
| 6,116,505 A | 9/2000 | Withrow |
| 6,163,738 A | 12/2000 | Miller |
| 6,182,893 B1 | 2/2001 | Greene et al. |
| 6,184,846 B1 | 2/2001 | Myers et al. |
| 6,230,767 B1 | 5/2001 | Nelson |
| 6,234,222 B1 | 5/2001 | Nelson |
| 6,237,647 B1 | 5/2001 | Pong et al. |
| 6,237,652 B1 | 5/2001 | Nelson |
| 6,264,103 B1 | 7/2001 | Stanley |
| 6,313,737 B1 | 11/2001 | Freeze et al. |
| 6,332,128 B1 | 12/2001 | Nicholson |
| 6,360,141 B1 | 3/2002 | Jensen |
| 6,364,206 B1 | 4/2002 | Keohane |
| 6,367,516 B1 | 4/2002 | Christman et al. |
| 6,424,884 B1 | 7/2002 | Brooke, Jr. et al. |
| 6,457,038 B1 | 9/2002 | Defosse |
| 6,470,288 B1 | 10/2002 | Keidel et al. |
| 6,535,726 B1 | 3/2003 | Johnson |
| 6,564,999 B1 * | 5/2003 | Saveliev ............ G06K 7/10861 235/383 |
| 6,572,016 B2 | 6/2003 | Saveliev et al. |
| 6,618,362 B1 | 9/2003 | Terranova |
| 6,685,089 B2 | 2/2004 | Terranova et al. |
| 6,688,134 B2 * | 2/2004 | Barton .................... B67D 1/00 141/351 |
| 6,705,356 B2 | 3/2004 | Barton et al. |
| 6,710,701 B2 | 3/2004 | Leatherman |
| 6,725,106 B1 | 4/2004 | Covington et al. |
| 6,759,072 B1 | 7/2004 | Gutwein et al. |
| 6,766,949 B2 | 7/2004 | Terranovo et al. |
| 6,822,551 B2 | 11/2004 | Li et al. |
| 6,869,013 B2 | 3/2005 | Allen et al. |
| 6,931,984 B2 | 8/2005 | Lassota |
| 6,933,849 B2 | 8/2005 | Sawyer |
| 6,991,160 B2 | 1/2006 | Demere |
| 7,031,804 B2 | 4/2006 | Brooke, Jr. et al. |
| 7,032,818 B2 * | 4/2006 | Thomas ................ G06K 17/00 235/462.46 |
| 7,171,989 B2 | 2/2007 | Corless et al. |
| 7,197,377 B2 | 3/2007 | Knepler |
| 7,376,495 B2 | 5/2008 | Coggins et al. |
| 7,379,897 B2 | 5/2008 | Pinkus |
| 7,387,239 B2 | 6/2008 | Thomas et al. |
| 7,425,900 B2 | 9/2008 | Lynn et al. |
| 7,439,859 B2 * | 10/2008 | Humphrey ........... G06Q 20/105 235/383 |
| 7,455,867 B1 | 11/2008 | Gutwein et al. |
| 7,591,288 B2 | 9/2009 | Bitoh |
| 7,597,252 B1 | 10/2009 | Dewitt |
| 7,617,850 B1 * | 11/2009 | Dorney ................ B67D 1/0888 141/351 |
| 7,624,042 B2 | 11/2009 | Negley, III et al. |
| 7,637,205 B2 | 12/2009 | Greiwe et al. |
| 7,640,185 B1 | 12/2009 | Giordano et al. |
| 7,682,354 B2 | 3/2010 | Trompen et al. |
| 7,806,294 B2 * | 10/2010 | Gatipon ................ B67D 1/0036 222/1 |
| 7,810,722 B2 | 10/2010 | Dodson |
| 7,828,175 B2 * | 11/2010 | Bethuy ................ B67D 1/1272 222/144.5 |
| 7,845,375 B2 * | 12/2010 | Dorney ................ B67D 1/0888 141/237 |
| 7,890,209 B2 | 2/2011 | Knepler |
| 7,899,713 B2 | 3/2011 | Rothschild |
| 7,900,799 B2 | 3/2011 | Kuzar et al. |
| 7,907,058 B2 | 3/2011 | Weitzhandler et al. |
| 7,912,577 B2 | 3/2011 | Siler |
| 7,948,376 B2 | 5/2011 | Deline |
| 8,015,088 B2 | 9/2011 | Phillips et al. |
| 8,062,684 B2 | 11/2011 | Gutwein et al. |
| 8,109,301 B1 * | 2/2012 | Denise ..................... F25C 5/22 222/113 |
| 8,121,917 B2 | 2/2012 | Insolia et al. |
| 8,127,805 B2 | 3/2012 | Dorney |
| 8,130,083 B2 | 3/2012 | Dorney |
| 8,151,832 B1 * | 4/2012 | Dorney ................... G07F 9/001 141/94 |
| 8,162,176 B2 | 4/2012 | Rudick |
| 8,176,948 B2 * | 5/2012 | Carrig ..................... H04W 4/08 141/82 |
| 8,181,826 B2 | 5/2012 | Wainwright |
| 8,245,739 B1 * | 8/2012 | Wade .................. G06Q 20/3278 141/351 |
| 8,261,780 B2 | 9/2012 | Thomas et al. |
| 8,267,317 B1 | 9/2012 | Gulli |
| 8,335,592 B2 | 12/2012 | Deo et al. |
| 8,340,815 B2 | 12/2012 | Peters et al. |
| 8,364,094 B2 | 1/2013 | Weitzhandler et al. |
| 8,408,255 B1 * | 4/2013 | Wade .................... G07F 13/065 141/311 A |

(56) References Cited

U.S. PATENT DOCUMENTS

| | | |
|---|---|---|
| 8,408,257 B2 | 4/2013 | Ono et al. |
| 8,417,377 B2 | 4/2013 | Rothschild |
| 8,434,642 B2 | 5/2013 | Rudick |
| 8,442,674 B2 | 5/2013 | Tilton et al. |
| 8,485,233 B2 | 7/2013 | Allinson et al. |
| 8,490,829 B2 * | 7/2013 | Deo .................. G07F 13/065 700/285 |
| 8,502,671 B2 | 8/2013 | Marcovici |
| 8,511,348 B2 | 8/2013 | Lillard, Jr. |
| 8,515,574 B2 | 8/2013 | Studor et al. |
| 8,523,065 B1 | 9/2013 | Wade et al. |
| 8,554,688 B2 | 10/2013 | Harrell et al. |
| 8,610,536 B2 | 12/2013 | Libby et al. |
| 8,665,069 B2 | 3/2014 | Weitzhandler et al. |
| 8,688,277 B2 | 4/2014 | Studor et al. |
| 8,744,618 B2 | 6/2014 | Peters et al. |
| 8,744,939 B2 | 6/2014 | Phillips et al. |
| 8,755,932 B2 | 6/2014 | Peters et al. |
| 8,757,010 B2 | 6/2014 | Williams et al. |
| 8,757,222 B2 * | 6/2014 | Rudick .................. G07F 9/009 141/94 |
| 8,763,956 B2 | 7/2014 | Beck |
| 8,768,505 B2 | 7/2014 | Thompson |
| 8,774,963 B2 | 7/2014 | Signorelli et al. |
| 8,776,838 B1 | 7/2014 | Dorney |
| 8,788,090 B2 | 7/2014 | Rothschild |
| 8,798,799 B2 | 8/2014 | Deo et al. |
| 8,814,000 B2 | 8/2014 | Rudick |
| 8,825,538 B2 | 9/2014 | Insolia et al. |
| 8,839,343 B2 | 9/2014 | Wang |
| 8,863,649 B1 | 10/2014 | Rao et al. |
| 8,875,843 B2 | 11/2014 | Cihak et al. |
| 8,880,427 B1 | 11/2014 | Jones |
| 8,910,674 B2 * | 12/2014 | Segiet ................ G06Q 20/3278 141/192 |
| 8,924,037 B2 | 12/2014 | Seymour et al. |
| 8,945,374 B2 | 2/2015 | Chase |
| 8,956,579 B2 | 2/2015 | Yankee et al. |
| 8,960,075 B2 | 2/2015 | Traitler et al. |
| 8,965,790 B2 | 2/2015 | Grigg et al. |
| 8,972,048 B2 | 3/2015 | Canora et al. |
| 8,996,178 B2 | 3/2015 | Studor et al. |
| 9,020,635 B2 * | 4/2015 | Hortin .................... F25D 29/00 62/127 |
| 9,026,245 B2 | 5/2015 | Tilton et al. |
| 9,051,162 B2 * | 6/2015 | Peters ..................... G07F 9/001 |
| 9,053,503 B2 | 6/2015 | Carapelli |
| 9,054,818 B2 | 6/2015 | Wang |
| 9,061,879 B2 | 6/2015 | Patthey |
| 9,087,427 B2 | 7/2015 | Weston et al. |
| 9,111,303 B2 | 8/2015 | Nicol et al. |
| 9,111,312 B2 | 8/2015 | Jones |
| 9,113,749 B2 | 8/2015 | Castellani et al. |
| 9,212,040 B2 * | 12/2015 | Segiet .................. G07F 13/065 |
| 9,240,007 B2 | 1/2016 | Trevino et al. |
| 9,245,402 B2 | 1/2016 | Green et al. |
| 9,246,611 B2 | 1/2016 | Wang |
| 9,297,577 B2 * | 3/2016 | Anselmino ............. F25D 29/00 |
| 9,305,406 B2 | 4/2016 | Divelbiss et al. |
| 9,310,024 B2 | 4/2016 | Plummer et al. |
| 9,334,149 B2 | 5/2016 | Dorney |
| 9,334,150 B1 | 5/2016 | Ost et al. |
| 9,340,298 B1 | 5/2016 | Dunn, Jr. et al. |
| 9,365,406 B2 | 6/2016 | Hortin |
| 10,315,907 B2 * | 6/2019 | Segiet ..................... G07F 13/10 |
| 2002/0004690 A1 | 1/2002 | Paulucci et al. |
| 2002/0100801 A1 | 8/2002 | Na-Ranong |
| 2002/0116261 A1 | 8/2002 | Moskowitz et al. |
| 2003/0025600 A1 | 2/2003 | Blanchard |
| 2003/0028285 A1 | 2/2003 | Zura et al. |
| 2003/0065567 A1 | 4/2003 | Dodson et al. |
| 2003/0065630 A1 | 4/2003 | Brown et al. |
| 2003/0071806 A1 | 4/2003 | Annand |
| 2003/0074194 A1 | 4/2003 | Finnegan |
| 2003/0197060 A1 | 10/2003 | Coyner |
| 2003/0200108 A1 | 10/2003 | Malnoe |
| 2004/0167664 A1 | 8/2004 | Griffin |
| 2004/0260425 A1 | 12/2004 | Giacaman |
| 2005/0029287 A1 | 2/2005 | Mobbs |
| 2005/0034606 A1 | 2/2005 | In Albon |
| 2005/0061390 A1 | 3/2005 | Mathis et al. |
| 2005/0066576 A1 | 3/2005 | Morris et al. |
| 2005/0087255 A1 * | 4/2005 | Humphrey ............. G07F 7/025 141/94 |
| 2005/0099304 A1 * | 5/2005 | Humphrey ........... G06Q 20/204 340/539.26 |
| 2005/0105395 A1 | 5/2005 | Harrison |
| 2005/0145650 A1 | 7/2005 | Henry et al. |
| 2005/0252933 A1 * | 11/2005 | Manisco ............. B67D 1/0888 222/113 |
| 2006/0012479 A1 | 1/2006 | Ezra |
| 2006/0091201 A1 | 5/2006 | Simonson |
| 2006/0097009 A1 | 5/2006 | Bethuy et al. |
| 2006/0190128 A1 | 8/2006 | Brooke et al. |
| 2006/0190345 A1 | 8/2006 | Crowley |
| 2006/0196571 A1 | 9/2006 | Kassner |
| 2007/0026916 A1 | 2/2007 | Juds et al. |
| 2007/0036348 A1 | 2/2007 | Orr |
| 2007/0073557 A1 | 3/2007 | Abramson |
| 2007/0114244 A1 | 5/2007 | Gatipon et al. |
| 2007/0163673 A1 | 7/2007 | Kallberg |
| 2007/0174123 A1 | 7/2007 | Dorr |
| 2007/0235533 A1 | 10/2007 | Giordano |
| 2007/0239549 A1 | 10/2007 | Lafauci et al. |
| 2008/0058985 A1 | 3/2008 | Alcov |
| 2008/0126261 A1 | 5/2008 | Lovett |
| 2008/0128458 A1 * | 6/2008 | Njaastad ................... F25C 5/24 222/64 |
| 2008/0147539 A1 | 6/2008 | Robertson |
| 2008/0153567 A1 | 6/2008 | Juds et al. |
| 2008/0189078 A1 | 8/2008 | Vok et al. |
| 2008/0195251 A1 | 8/2008 | Milner |
| 2008/0195252 A1 | 8/2008 | Innocenti |
| 2008/0203146 A1 | 8/2008 | Betancourt et al. |
| 2008/0223481 A1 | 9/2008 | Gammon et al. |
| 2008/0235766 A1 | 9/2008 | Wallos et al. |
| 2008/0257948 A1 | 10/2008 | Jochim et al. |
| 2008/0262936 A1 | 10/2008 | Paardekooper et al. |
| 2009/0040050 A1 | 2/2009 | Humphrey |
| 2009/0071565 A1 | 3/2009 | Ding |
| 2009/0152345 A1 | 6/2009 | Johnson |
| 2009/0157515 A1 | 6/2009 | Lafauci et al. |
| 2009/0177318 A1 | 7/2009 | Sizemore |
| 2009/0222339 A1 | 9/2009 | Antao et al. |
| 2009/0315729 A1 | 12/2009 | Inhoffer |
| 2010/0023162 A1 | 1/2010 | Gresak et al. |
| 2010/0125362 A1 * | 5/2010 | Canora ................ G06Q 20/327 235/487 |
| 2010/0187298 A1 | 7/2010 | Phillips et al. |
| 2010/0198643 A1 | 8/2010 | Friedman et al. |
| 2010/0258587 A1 | 10/2010 | Wheeler et al. |
| 2010/0265033 A1 | 10/2010 | Cheung |
| 2010/0319803 A1 | 12/2010 | Mowzoon et al. |
| 2011/0035049 A1 | 2/2011 | Barrett |
| 2011/0100506 A1 | 5/2011 | Zabludovsky-Nerubay |
| 2011/0100507 A1 | 5/2011 | Weitzhandler et al. |
| 2011/0121019 A1 | 5/2011 | Peer et al. |
| 2011/0123688 A1 | 5/2011 | Deo et al. |
| 2011/0168775 A1 | 7/2011 | Van Zetten |
| 2011/0172816 A1 | 7/2011 | Ezra |
| 2011/0184812 A1 | 7/2011 | Stoulil |
| 2011/0278191 A1 | 11/2011 | Lillard, Jr. et al. |
| 2011/0282724 A1 | 11/2011 | Hwang |
| 2011/0295415 A1 | 12/2011 | Bartlett et al. |
| 2012/0047007 A1 | 2/2012 | Halsey et al. |
| 2012/0103926 A1 | 5/2012 | Ibsies |
| 2012/0136478 A1 | 5/2012 | Anand et al. |
| 2012/0136479 A1 | 5/2012 | Signorelli et al. |
| 2012/0139735 A1 | 6/2012 | Dollner et al. |
| 2012/0156337 A1 | 6/2012 | Studor et al. |
| 2012/0162422 A1 | 6/2012 | Lester |
| 2012/0166117 A1 | 6/2012 | Warburton et al. |
| 2012/0245732 A1 | 9/2012 | Yoakim |
| 2013/0043304 A1 | 2/2013 | Agon et al. |

(56) References Cited

U.S. PATENT DOCUMENTS

| | | |
|---|---|---|
| 2013/0079926 A1 | 3/2013 | Peters et al. |
| 2013/0085600 A1 | 4/2013 | Nicol et al. |
| 2013/0087050 A1 | 4/2013 | Studor et al. |
| 2013/0092567 A1 | 4/2013 | Lok |
| 2013/0096715 A1 | 4/2013 | Chung et al. |
| 2013/0140324 A1 | 6/2013 | Deo et al. |
| 2013/0232019 A1 | 9/2013 | Frieden et al. |
| 2013/0246171 A1 | 9/2013 | Carapelli |
| 2013/0284029 A1 | 10/2013 | Reed et al. |
| 2013/0297066 A1 | 11/2013 | Alvern et al. |
| 2013/0340453 A1 | 12/2013 | Chan |
| 2013/0341395 A1 | 12/2013 | Chan |
| 2014/0053944 A1 | 2/2014 | Wang |
| 2014/0053950 A1 | 2/2014 | Vandersteen |
| 2014/0059133 A1 | 2/2014 | Wang |
| 2014/0081777 A1 | 3/2014 | Mastrodonato et al. |
| 2014/0110476 A1 | 4/2014 | Sheehan et al. |
| 2014/0114469 A1 | 4/2014 | Givens et al. |
| 2014/0142749 A1 | 5/2014 | Peters et al. |
| 2014/0172179 A1 | 6/2014 | Baudin, Jr. et al. |
| 2014/0196811 A1 | 7/2014 | Ramos, III et al. |
| 2014/0263447 A1 | 9/2014 | Peters, Jr. et al. |
| 2014/0290181 A1 | 10/2014 | Edwards et al. |
| 2014/0297026 A1 | 10/2014 | Peters, Jr. et al. |
| 2014/0309770 A1 | 10/2014 | Signorelli et al. |
| 2014/0337159 A1 | 11/2014 | Rothschild |
| 2014/0337234 A1 | 11/2014 | Tang et al. |
| 2014/0337795 A1 | 11/2014 | Deo et al. |
| 2014/0361035 A1 | 12/2014 | Rudick |
| 2015/0039776 A1 | 2/2015 | Jarnagin, III |
| 2015/0053302 A1 | 2/2015 | Willis et al. |
| 2015/0110931 A1 | 4/2015 | Chase |
| 2015/0161590 A1 | 6/2015 | Genovez |
| 2015/0164264 A1 | 6/2015 | Studor et al. |
| 2015/0191341 A1 | 7/2015 | Martindale et al. |
| 2015/0217985 A1 * | 8/2015 | Raley ............... B67D 1/0888 700/237 |
| 2015/0225223 A1 | 8/2015 | Morales |
| 2015/0225224 A1 | 8/2015 | Tilton et al. |
| 2015/0230653 A1 | 8/2015 | Cheng |
| 2015/0242969 A1 | 8/2015 | Pallas et al. |
| 2015/0251891 A1 | 9/2015 | Peters et al. |
| 2015/0305548 A1 | 10/2015 | Girault et al. |
| 2015/0325075 A1 | 11/2015 | Jones et al. |
| 2015/0348343 A1 | 12/2015 | Bianco et al. |
| 2015/0353338 A1 | 12/2015 | Nicol et al. |
| 2015/0368088 A1 | 12/2015 | Patel et al. |
| 2016/0012261 A1 | 1/2016 | Kelrich et al. |
| 2016/0086163 A1 | 3/2016 | Hosny et al. |
| 2016/0092851 A1 | 3/2016 | De Berg Hewett |
| 2016/0096715 A1 | 4/2016 | Segiet et al. |
| 2016/0098883 A1 | 4/2016 | Green et al. |
| 2016/0209106 A1 | 7/2016 | Anselmino et al. |
| 2016/0245852 A1 | 8/2016 | Warburton et al. |
| 2016/0264395 A1 | 9/2016 | Hortin |

FOREIGN PATENT DOCUMENTS

| | | |
|---|---|---|
| WO | WO 0046101 A1 | 8/2000 |
| WO | WO 0052655 A1 | 9/2000 |
| WO | WO 0103983 A1 | 1/2001 |
| WO | WO 0112033 A2 | 2/2001 |
| WO | WO 0112034 A2 | 2/2001 |
| WO | WO 0112038 A2 | 2/2001 |
| WO | WO 0117893 A2 | 3/2001 |
| WO | WO 0130687 A1 | 5/2001 |
| WO | WO 0152621 A2 | 7/2001 |
| WO | WO 0170624 A2 | 9/2001 |
| WO | WO 0207120 A1 | 1/2002 |
| WO | WO 0224569 A1 | 3/2002 |
| WO | WO 03005295 A1 | 1/2003 |
| WO | WO 03104139 A1 | 12/2003 |
| WO | WO 04024615 A1 | 3/2004 |
| WO | WO 04030435 A2 | 4/2004 |
| WO | WO 04096694 A1 | 11/2004 |
| WO | WO 04097690 A1 | 11/2004 |
| WO | WO 05003022 A1 | 1/2005 |
| WO | WO 05043469 A1 | 5/2005 |
| WO | WO 05053986 A1 | 6/2005 |
| WO | WO 05111955 A1 | 11/2005 |
| WO | WO 06021039 A1 | 3/2006 |
| WO | WO 06022655 A1 | 3/2006 |
| WO | WO 06066338 A1 | 6/2006 |
| WO | WO 06087376 A1 | 8/2006 |
| WO | WO 06110062 A1 | 10/2006 |
| WO | WO 06125279 A1 | 11/2006 |
| WO | WO 07015905 A2 | 2/2007 |
| WO | WO 07059781 A1 | 5/2007 |
| WO | WO 07135661 A1 | 11/2007 |
| WO | WO 08004755 A1 | 1/2008 |
| WO | WO 08096361 A2 | 8/2008 |
| WO | WO 08114174 A2 | 9/2008 |
| WO | WO 09016610 A2 | 2/2009 |
| WO | WO 09032686 A1 | 3/2009 |
| WO | WO 09032929 A2 | 3/2009 |
| WO | WO 09032938 A2 | 3/2009 |
| WO | WO 09032941 A2 | 3/2009 |
| WO | WO 09032946 A1 | 3/2009 |
| WO | WO 09058095 A1 | 5/2009 |
| WO | WO 09092473 A1 | 7/2009 |
| WO | WO 09104104 A1 | 8/2009 |
| WO | WO 09111286 A1 | 9/2009 |
| WO | WO 09111289 A1 | 9/2009 |
| WO | WO 09111291 A1 | 9/2009 |
| WO | WO 09115774 A2 | 9/2009 |
| WO | WO 10010587 A1 | 1/2010 |
| WO | WO 10075557 A1 | 7/2010 |
| WO | WO 10093747 A2 | 8/2010 |
| WO | WO 11050799 A1 | 5/2011 |
| WO | WO 11066438 A1 | 6/2011 |
| WO | WO 11066444 A1 | 6/2011 |
| WO | WO 11066448 A1 | 6/2011 |
| WO | WO 11067156 A1 | 6/2011 |
| WO | WO 11067232 A1 | 6/2011 |
| WO | WO 11094625 A1 | 8/2011 |
| WO | WO 11101783 A1 | 8/2011 |
| WO | WO 12004771 A1 | 1/2012 |
| WO | WO 12032543 A1 | 3/2012 |
| WO | WO 12038387 A1 | 3/2012 |
| WO | WO 12058449 A1 | 5/2012 |
| WO | WO 12083194 A2 | 6/2012 |
| WO | WO 12084573 A1 | 6/2012 |
| WO | WO 12129686 A1 | 10/2012 |
| WO | WO 12134296 A1 | 10/2012 |
| WO | WO 12145649 A1 | 10/2012 |
| WO | WO 12174609 A1 | 12/2012 |
| WO | WO 13055938 A1 | 4/2013 |
| WO | WO 13158407 A1 | 10/2013 |
| WO | WO 14037923 A1 | 3/2014 |
| WO | WO 14076296 A1 | 5/2014 |
| WO | WO 14091284 A1 | 6/2014 |
| WO | WO 14096017 A1 | 6/2014 |
| WO | WO 14188389 A1 | 11/2014 |
| WO | WO 15017559 A1 | 2/2015 |
| WO | WO 15026767 A1 | 2/2015 |
| WO | WO 15103399 A1 | 7/2015 |
| WO | WO 15111056 A1 | 7/2015 |
| WO | WO 15117679 A1 | 8/2015 |
| WO | WO 16001214 A1 | 1/2016 |
| WO | WO 16041038 A1 | 3/2016 |
| WO | WO 16091758 A1 | 6/2016 |
| WO | WO 16111655 A1 | 7/2016 |

* cited by examiner

BEVERAGE DISPENSE VALVE CONTROLLED BY WIRELESS TECHNOLOGY

RELATED APPLICATION

This application is a continuation of U.S. application Ser. No. 16/435,873, filed Jun. 10, 2019, which is a continuation of U.S. application Ser. No. 15/624,149, filed Jun. 15, 2017, now U.S. Pat. No. 10,315,907, which is a continuation of U.S. application Ser. No. 14/968,101, filed Dec. 14, 2015, now U.S. Pat. No. 9,708,170, which is a continuation of U.S. application Ser. No. 14/528,695, filed Oct. 30, 2014, now U.S. Pat. No. 9,212,040, which is a continuation of U.S. application Ser. No. 12/704,217, filed Feb. 11, 2010, now U.S. Pat. No. 8,910,674, which claims the benefit of U.S. Provisional Patent Application No. 61/151,770, filed on Feb. 11, 2009. These applications are incorporated herein by reference in their entirety.

FIELD OF THE INVENTION

The invention relates generally to dispensing fluids. More specifically, the invention provides methods and systems for dispensing fluids, such as beverages, using wireless technology.

BACKGROUND OF THE INVENTION

The present invention relates to dispensing fluids, such as beverages, using wireless technology. Retail establishments, for example fast food restaurants and convenience stores, often utilize fountain drink dispensers to dispense servings of different beverages to multiple users. Using such beverage dispensers allows consumers to purchase a cup or other containers that may be filled with one or more beverages at the beverage dispenser. Unfortunately, however, traditional systems cannot adequately monitor the user's actions to confirm the user obtained the beverage paid for. Indeed, some "premium" beverages may be offered at the beverage dispenser, however, there is no efficient method or system to efficiently monitor whether consumers pay for the drink they consume.

SUMMARY OF THE INVENTION

The following presents a simplified summary of the disclosure in order to provide a basic understanding of some aspects of the invention by way of exemplary embodiments. These embodiments do not define key or critical elements of the invention or to delineate the scope of the invention. The following summary merely presents some of the concepts of the disclosure in a simplified form as a prelude to the more detailed description of aspects of the invention provided below.

Aspects of the invention relate to a beverage dispensing system, having at least one beverage container and at least one beverage dispenser. The beverage container may include a sidewall disposed around a central bottom, wherein the bottom is distal to an opening for receiving a beverage, and a container wireless transceiver associated with the container. In one embodiment, the container wireless transceiver may be affixed to the bottom of the container. In other embodiments, the container wireless transceiver may be affixed to the sidewall of the container. Yet in other embodiments, the container wireless transceiver may be located in an impermeable layer between the sidewall and the bottom of the container, wherein the impermeable layer is not in fluid communication with the location where the beverage would be received in the opening. Additionally, the container wireless transceiver may be configured to transmit an electronic signal indicative that the beverage container is validated to receive a beverage and whether the beverage container is properly located to receive the beverage from the valve of the drink dispenser.

In aspects in accordance with this invention, the beverage dispenser may include a housing, a valve extending from the housing configured to dispense the beverage into the container located below the valve, and a dispenser wireless transceiver located in close proximity to the beverage dispenser configured to communicate with the container wireless transceiver on the beverage container. The beverage dispenser may further include a valve lever that extends from the housing, wherein in some embodiments the dispenser wireless transceiver may be located on the valve lever. In other embodiments, the valve lever may include a lever backing that extends from the housing, wherein the dispenser wireless transceiver is located on the lever backing. The dispenser wireless transceiver may be configured to receive a return signal from a compatible container indicative that the beverage container is validated to receive the beverage from the beverage dispenser and whether the beverage container is properly located to receive the beverage. Additionally, when the dispenser wireless transceiver is positioned such that upon placement of a compatible container in a location to properly receive the beverage from the valve, the dispenser wireless transceiver may be aligned with the container wireless transceiver of the beverage container. In yet another embodiment, when the beverage container is placed under the valve, the dispenser wireless transceiver may transmit a first electronic signal to the beverage container and the container wireless transceiver may transmit a second electronic signal to the dispenser wireless transceiver to confirm proper placement under the valve and to confirm that the beverage container is a compatible container to receive the beverage from the valve, and wherein the valve subsequently dispenses the beverage into the beverage container.

Further aspects of the invention are related to a beverage container configured to communicate with a beverage dispenser that includes a dispenser wireless transceiver. The beverage container may include a sidewall disposed around a central bottom, wherein the bottom is distal to an opening for receiving a beverage and a container wireless transceiver affixed to the container, with the container wireless transceiver configured to communicate with the dispenser wireless transceiver. In one embodiment, the container wireless transceiver may be affixed to the bottom of the container. In other embodiments, the container wireless transceiver may be affixed to the sidewall of the container. Yet in other embodiments, the container wireless transceiver may be located in an impermeable layer between the sidewall and the bottom of the container, wherein the impermeable layer is not in fluid communication with the location where the beverage would be received in the opening. Additionally, the container wireless transceiver may be configured to transmit an electronic signal indicative that the beverage container is validated to receive a beverage and whether the beverage container is properly located to receive the beverage from the valve of the drink dispenser.

Further aspects of the invention are related to a beverage dispenser configured to communicate with a beverage container that includes a wireless transceiver. The beverage dispenser may include a housing, a valve extending from the housing configured to dispense the beverage into the container located below the valve, and a dispenser wireless transceiver located in close proximity to the beverage dispenser configured to communicate with the container wireless transceiver on the beverage container. The beverage dispenser may further include a valve lever that extends from the housing, wherein in some embodiments the dispenser wireless transceiver may be located on the valve lever. In other embodiments, the valve lever may include a lever backing that extends from the housing, wherein the dispenser wireless transceiver is located on the lever backing. The dispenser wireless transceiver may be configured to receive a return signal from a compatible container indicative that the beverage container is validated to receive the beverage from the beverage dispenser and whether the beverage container is properly located to receive the beverage. Additionally, when the dispenser wireless transceiver is positioned such that upon placement of a compatible container in a location to properly receive the beverage from the valve, the dispenser wireless transceiver may be aligned with the container wireless transceiver of the beverage container. In yet another embodiment, when the beverage container is placed under the valve, the dispenser wireless transceiver may transmit a first electronic signal to the beverage container and the container wireless transceiver may transmit a second electronic signal to the dispenser wireless transceiver to confirm proper placement under the valve and to confirm that the beverage container is a compatible container to receive the beverage from the valve, and wherein the valve subsequently dispenses the beverage into the beverage container.

Further aspects of the invention are related to a method for dispensing fluids for example with the container and beverage dispenser or beverage dispensing system as described above. The method may include the steps of: 1) sensing a beverage container in close proximity to a beverage dispenser; 2) transmitting a first electronic signal to the beverage container from a dispenser wireless transceiver located in close proximity to the beverage dispenser; 3) transmitting a second electronic signal to the dispenser wireless transceiver from a container wireless transceiver associated with the container; and 4) dispensing the fluid from the beverage dispenser to the beverage container. Additionally, the transmission of the first electronic signal and the second electronic signal may confirm the proper placement of the beverage container under the beverage dispenser and may confirm that the beverage container is a compatible container to receive a fluid from the beverage dispenser.

These and other features and advantages of the present invention will become apparent from the description of the preferred embodiments, with reference to the accompanying drawing figures.

BRIEF DESCRIPTION OF THE DRAWINGS

The present disclosure is illustrated by way of example and not limited in the accompanying figures in which like reference numerals indicate similar elements and in which.

The reader is advised that the attached drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1:
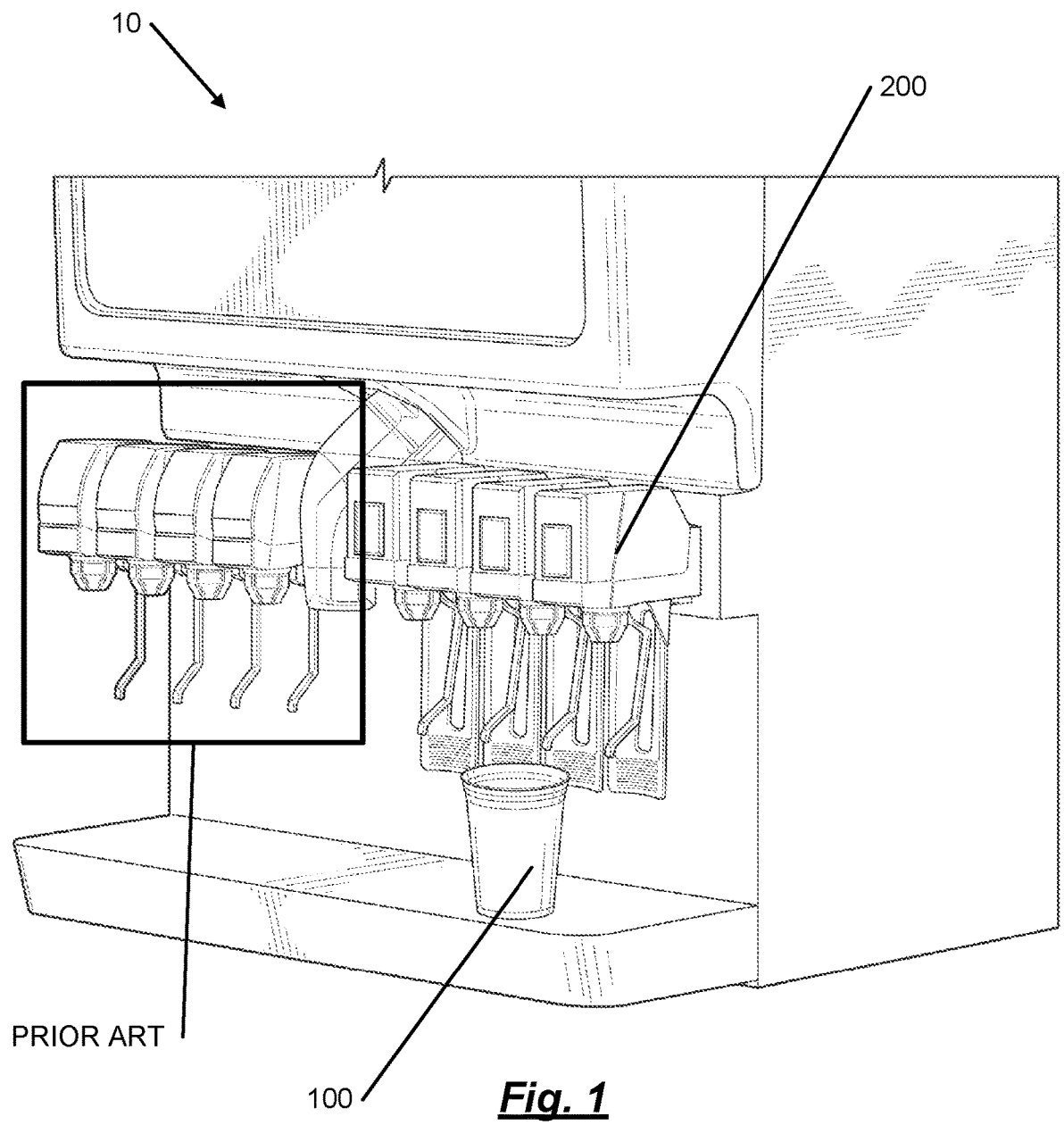
FIG. 1 illustrates a perspective view of an exemplary beverage dispensing system in accordance with aspects of the invention.

An exemplary beverage dispensing system may comprise one or more components shown in FIGS. 1 through 3C. As illustrated in FIGS. 1 through 3C, the beverage dispensing system 10 may comprise a container 100 and a beverage dispenser 200. As is shown in FIG. 1, the beverage dispensing system may include one or more beverage dispensers 200. Additionally, as shown in FIG. 1, the beverage dispensing system may include beverage dispensers in accordance with the present invention and traditional beverage dispensers utilized in the prior art, represented by the box labeled "PRIOR ART" in FIG. 1.

Figure 2:
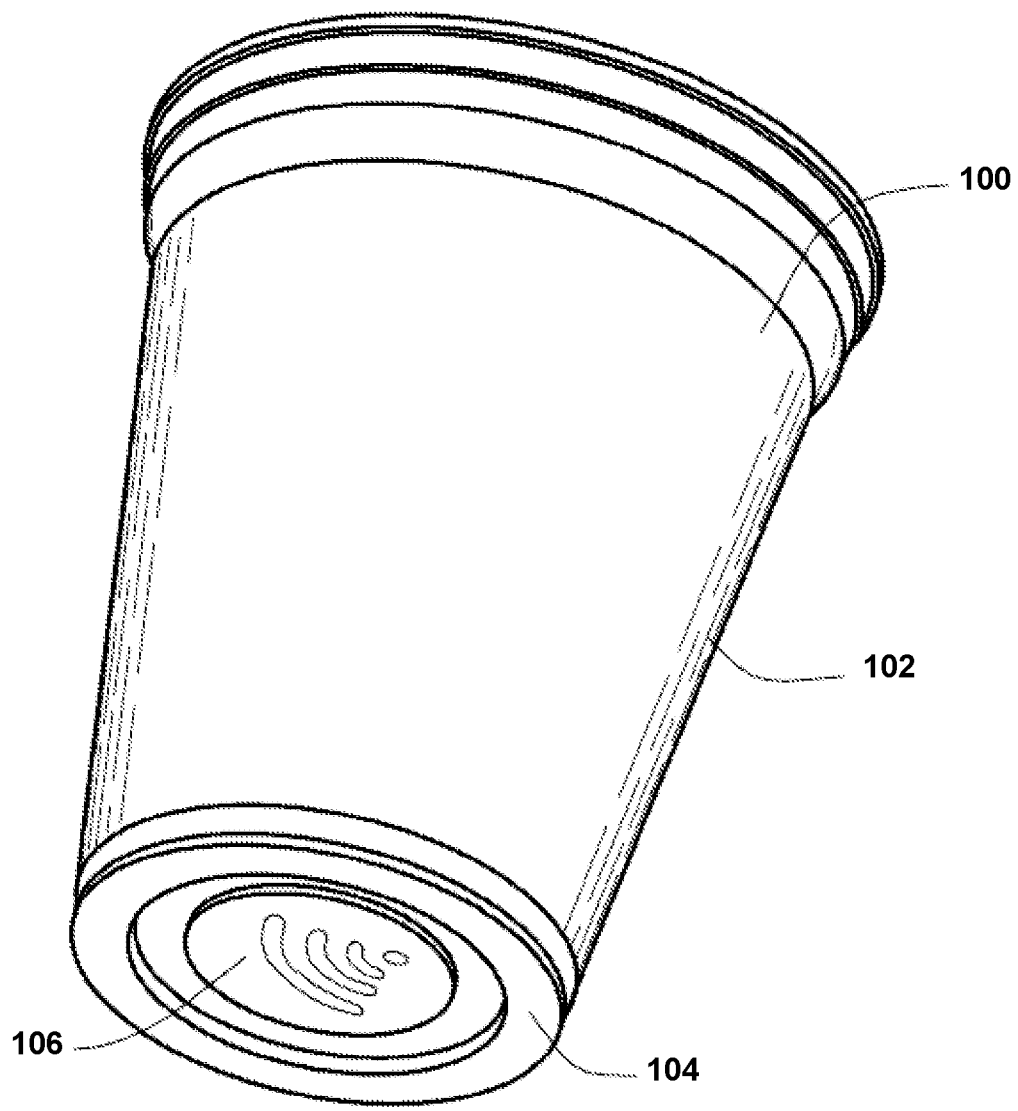
FIG. 2 illustrates a perspective view of an exemplary beverage container that may be used with the beverage dispensing system from FIG. 1 in accordance with aspects of the invention.

As illustrated in FIG. 2, aspects of the invention relate to novel beverage containers that can be utilized with a beverage dispenser 200 in accordance with this invention, such as container 100. Exemplary container 100 may contain a sidewall 102 disposed around a central bottom 104, wherein the bottom 104 is distal to an opening (not shown) for receiving a beverage. While the exemplary container 100 is shown as an open-faced cup, those skilled in the art will readily appreciate that other containers that are configured to hold a beverage, such as a bottle, can, bowl, or any structure that may receive a fluid, may be utilized in accordance with one or more embodiments of the invention.

Additionally, the container 100 may be made of any materials known and used in the art. The container 100 may be made the materials, such as: plastic, Styrofoam™, paper, or metal in accordance with aspects of this invention. Additionally, the container 100 may be any size as known and used in the art without departing from this invention.

In accordance with one embodiment, the container 100 comprises a wireless transceiver 106. The wireless transceiver 106 may be configured to utilize one or more forms of wireless technology, including but not limited to: radio frequency identification (RFID), electronic article surveillance (EAS), Bluetooth, cellular, and/or any transmissions in accordance with IEEE 802.xx. Indeed, any component(s) configured to transmit and/or receive wireless signals is within the scope of this disclosure. In accordance with aspects of this invention, the wireless transceiver 106 may be in the form of RFID, similar to examples such as automated automobile toll collection or security access cards. Additionally, the wireless transceiver 106 may be in the form of an EAS system. EAS systems are generally used in a retail setting for security and to help protect against shoplifting.

RFID systems generally may include one or more RFID tags that may be inductively-coupled, capacitively-coupled, active, semi-passive, and passive. In general, each RFID tag works by first, storing data within an RFID tag's microchip. The RFID tag may include an antenna that receives electromagnetic energy from an RFID reader's antenna. Using power from the RFID tag's internal battery or power harvested from the reader's electromagnetic field, the tag may then send radio waves back to the reader. The reader may then receive the RFID tag's radio waves and interpret the frequencies as meaningful data.

EAS systems may include technologies such as radio frequency (RF) systems, electromagnetic systems, acousto-magnetic systems, or microwave systems. RF systems generally work with an RF tag or label attached to a product, with the RF tag being basically a miniature, disposable electronic circuit and antenna. The RF tag or label may respond to a specific frequency emitted by a transmitter antenna. For electromagnetic systems, a magnetic, iron-containing strip may be attached to the product. This electromagnetic strip can be activated or deactivated using a highly intense magnetic field. The electromagnetic strip may respond to electromagnetic field transmitted from a transmitter antenna. For acousto-magnetic systems, a transmitter sends a radio-frequency signal in pulses, which in turn may energize a tag within the transmitted zone. When the pulse ends, the tag responds, emitting a single frequency signal like a tuning fork. While the transmitter is off between pulses, the tag signal is detected by the receiver and is checked to ensure it is the correct frequency. If all these criteria are met, the tag is signaled as correct (or alarmed in the example of a security system).

These wireless systems are different systems known and used in the art at the present time, however, any component(s) configured to transmit and/or receive wireless signals is within the scope of this invention.

As shown in FIG. 2, wireless transceiver 106 may be affixed or molded to the bottom 104 of the beverage container 100. In other embodiments, however, the wireless transceiver 106 may be located on, affixed to, or otherwise associated with a sidewall 102 of the container 100. Yet in further embodiments, the wireless transceiver 106 may be located within a secondary compartment of container 100. For example, an impermeable layer or structure may be placed between the sidewall 102 and/or the bottom 104 of the container 100 to create an internal compartment that is not in fluid communication with the location where a beverage would be received in the opening (not shown). As discussed in more detail below, the wireless transceiver 106 may be configured to transmit information to a beverage dispenser, such as a dispenser 200 shown in FIGS. 3A through 3C.

Figure 3A:
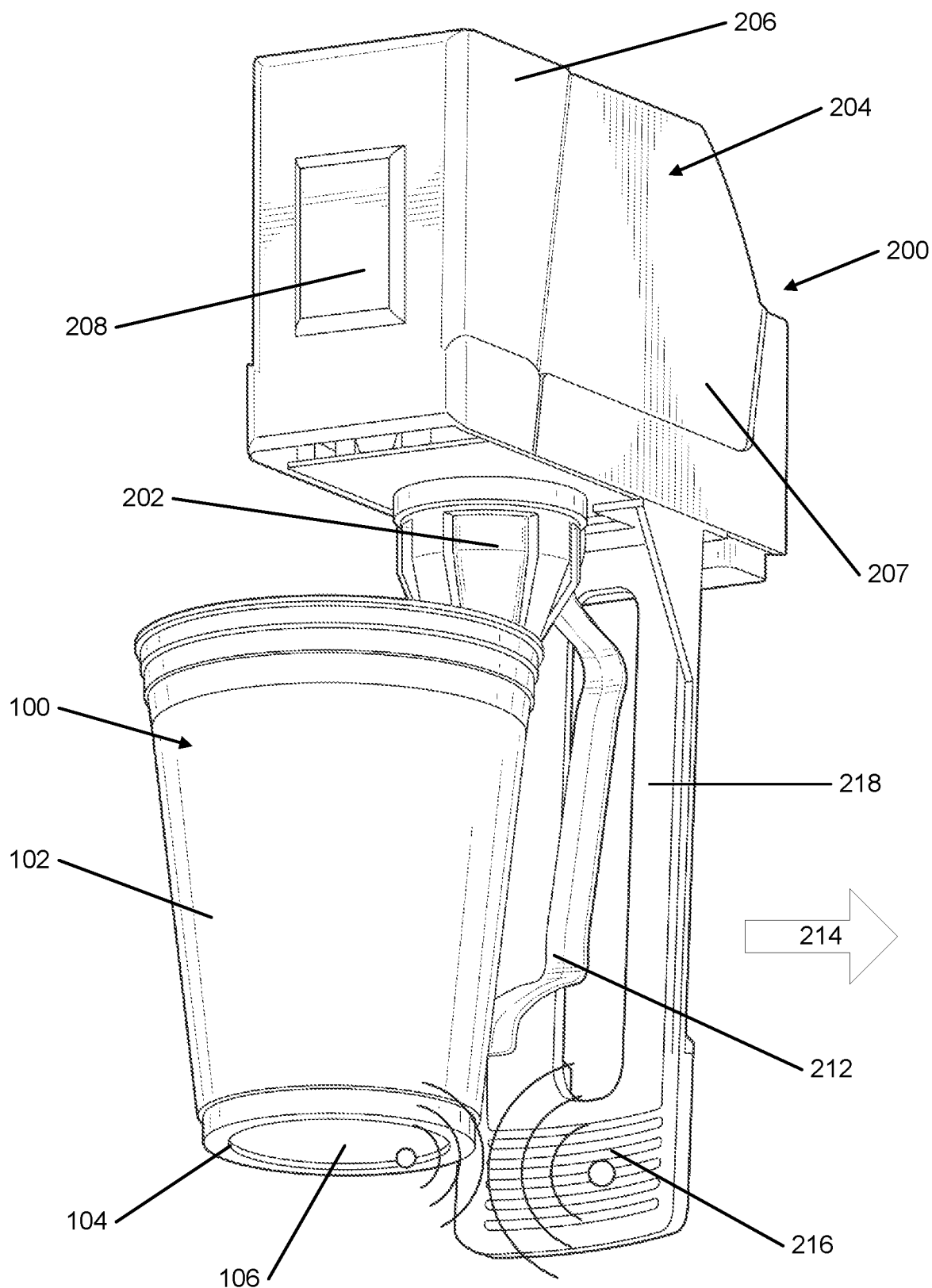
FIG. 3A illustrates a front perspective view of an exemplary beverage dispenser that may be used with the beverage dispensing system from FIG. 1 in accordance with aspects of the invention.
Figure 3B:
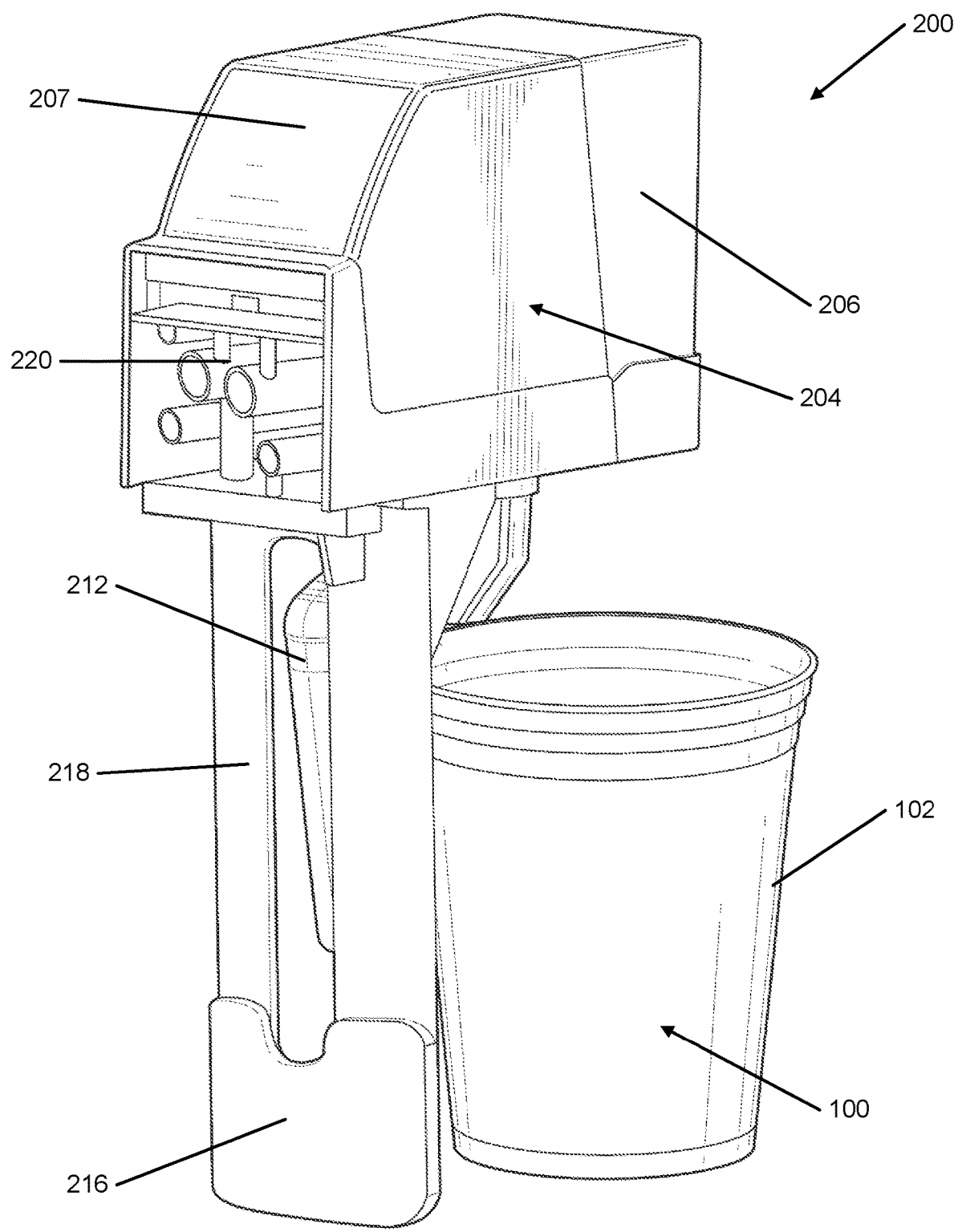
FIGS. 3B and 3C illustrate rear perspective views of the beverage dispenser from FIG. 3A in accordance with aspects of the invention.
Figure 3C:
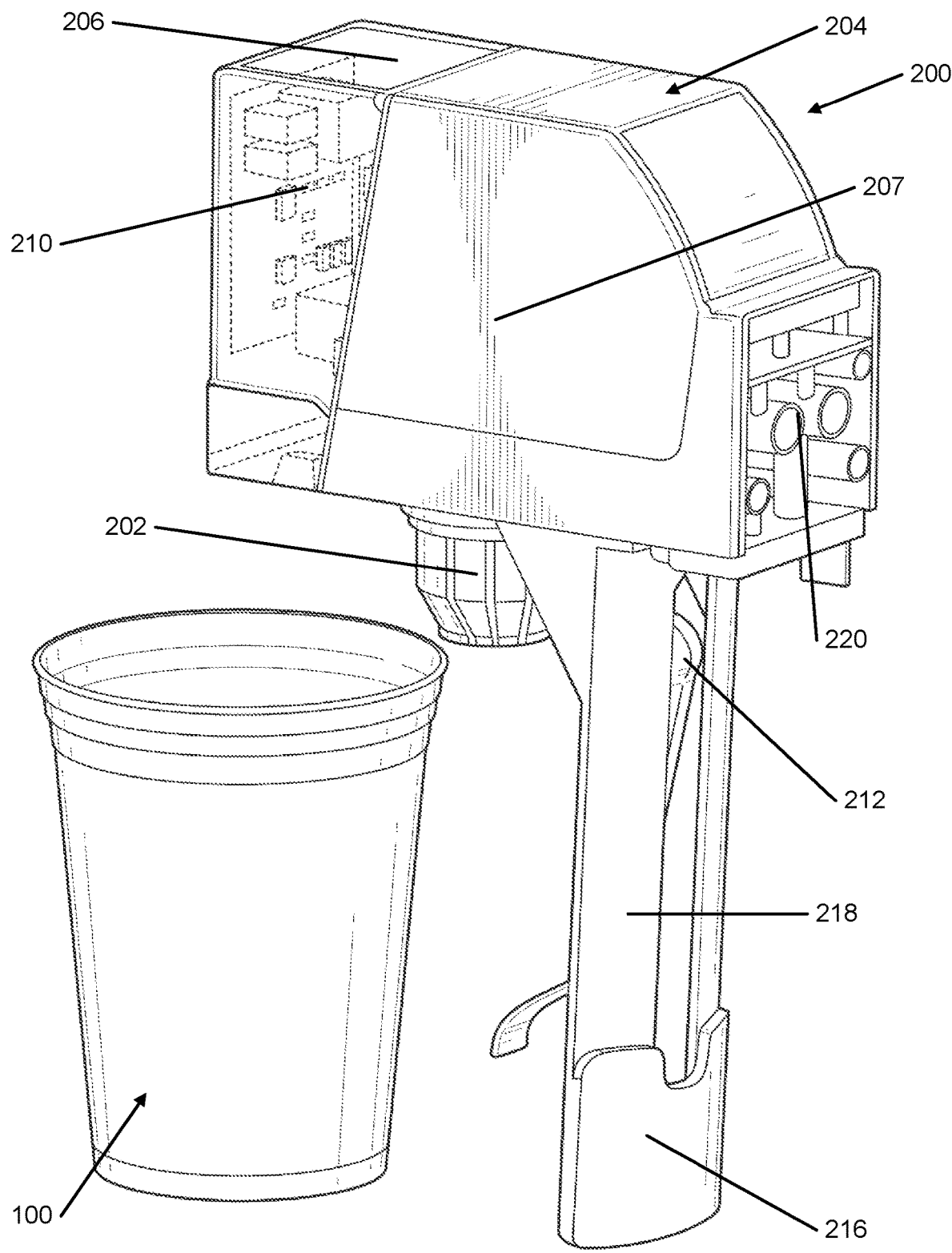

An exemplary beverage dispenser 200 is shown in FIGS. 3A through 3C. The term "beverage" has been used to readily convey exemplary embodiments to reader, however, those skilled in the art will readily appreciate that any liquid, gel, or similar product, including for example, concentrated syrup, is within the scope of the invention. Therefore, while the below embodiments are explained in relation to a ready-made beverage, readers are advised that the dispensing of any liquid, gel, or similar product is within the scope of the invention. The exemplary beverage dispenser 200 may generally resemble a traditional fountain-drink dispenser and may comprise a valve 202, a housing 204, and a valve lever 212.

As illustrated in FIGS. 3A through 3C, the housing 204 may include a front housing area 206 and a rear housing area 207. The front housing area 206 may include a push-button 208. The push-button 208 may include a logo of the beverage to be dispensed from the beverage dispenser 200. Additionally, the push-button 208 may illuminate at different times, such as when the push-button 208 is pushed, when the beverage dispenser 200 is ready, or when the beverage dispenser 200 is communicating with a container 100. Additionally, the push-button 208 may illuminate and blink at varying times or varying frequencies to signal events or activities. In accordance with aspects of this invention, the push-button 208 may only be a button, that may not be pushed at all. Pressing the push-button 208 may control the flow of the beverage from the valve 202 to the container 100. Additionally, in accordance with other aspects of this invention, the housing 204 may include a lever actuator that may actuate the valve 202 and dispense the beverage from the valve 202 to the container 100.

In addition to the push-button 208, the front housing 206 may also include electronics 210. The electronics 210 may be self-contained within the front housing 206 as is illustrated specifically in FIG. 3C. The electronics 210 may be in the form of a circuit board or other similar control electronics capable of controlling the functionality and operability of the beverage dispenser 200. The electronics 210 may also help facilitate communication between the container 100 and the beverage dispenser 200.

The rear housing 207 may include a set of connections 220 to the beverage dispensing system 10. As illustrated in FIGS. 3B and 3C, these connections 220 may include tubing or similar-type connection ends configured to attach to the tubing or connection of the beverage dispensing system 10. The connections 220 may also be capable of connecting directly to individual beverage lines, such as when the beverage dispenser 200 is not used as part of a beverage dispensing system 10.

As illustrated in FIGS. 3A through 3C, the beverage dispenser may also include a valve 202. The valve 202 may protrude or extend from the housing 204 as is shown in FIG. 3A. While the term "valve" is used throughout this disclosure, those skilled in the art will readily appreciate that any outlet configured to dispense a liquid is within the scope of invention. The valve 202 may be configured to dispense a beverage into a compatible container 100. Additionally, the valve 202 may include a relay or electromechanical switch that turns the valve on or off (or enabled or disabled) based on the presence of a compatible container 100.

Additionally, as illustrated in FIGS. 3A through 3C, the beverage dispenser may include a valve lever 212. The valve lever 212 may protrude or extend from the housing 204 as shown in FIG. 3A. The valve lever 212 may be of any of various shapes and sizes without departing from this invention. As discussed in more detail below, the use of the valve lever 212 may be further supplanted or replaced with a wireless transceiver, such as a wireless transceiver 216 located on the beverage dispenser 200. The valve lever 212 may also include a lever backing 218. The lever backing 218 may extend from the housing 204, and more specifically, from the rear housing 207. The lever backing 218 may include the wireless transceiver 216 as illustrated in FIG.

3A. For example, the wireless transceiver 216 may be located on the lower portion of the lever backing 218. Additionally, the beverage dispenser 200 may not include the lever backing 218, and in this instance, the transceiver 216 may be located on the valve lever 212. In another embodiment in accordance with this invention, the beverage dispenser 200 does not include a valve lever 212 and only includes the lever backing 218, wherein the transceiver 216 may be located on the lever backing 218.

As illustrated in FIGS. 3A through 3C, the beverage dispenser 200 and more specifically, the valve 202, may dispense a beverage into a compatible container, such as the container 100 as illustrated in FIG. 2. Construction of exemplary containers has been described above in relation to FIG. 2, and is also known in the art. As discussed below, however, in certain embodiments the presence and/or orientation of a wireless transceiver 106 within, affixed to, imbedded or otherwise associated with container 100 may be determinative of whether a beverage receptacle may be considered a compatible container 100.

In certain embodiments, valve 202 may be in operative communication with a valve lever 212 which may be mechanical, electrical, or electro-mechanical. In one embodiment having valve lever 212, pressure may be placed upon the valve lever 212 (for example, along the direction of arrow 214), as container 100 is placed under the valve 202. Pressure upon the valve lever 212 may transmit a signal (electrical or mechanical) indicating the presence of a container, such as container 100. In one embodiment where transceiver 216 is located on the lower portion of the lever backing 218, a container 100 configured for use with dispenser 200 may include the wireless transceiver 106 located on or near its bottom 104, such that the wireless transceiver 216 of the beverage dispenser 200 is aligned with wireless transceiver 106 of the container 100.

In one embodiment, the wireless transceiver 216 of the dispenser 200 is configured to transmit an electronic signal. The transmission of the electronic signal may be set to a continuous loop, such that the signal is continually transmitted. Yet in other embodiments, the transmission of the electronic signal may be dependent on one or more conditions, such as determined or influenced by a timer, a motion sensor (which may external to the dispenser 200) or any other hardware or software in communication with dispenser 200. As discussed above in relation to the embodiment shown in FIG. 3A, the wireless transceiver 216 may be located in the lever backing 218 of the valve lever 212, such that a consumer may press the container 100 against it to dispense the beverage from valve 202. In one embodiment, the electronic signal transmitted from wireless transceiver 216 is received by wireless transceiver 106 on container 100 when container 100 is correctly placed to receive a beverage from the valve 202. In this regard, one or both of the wireless transceivers 106, 216 are configured to transmit a signal that may only be received by the other when each are within a threshold distance from each other. Yet in other embodiments, the signal transmitted from one of the transceivers 106, 216 may be received by the other transceiver 106, 216 at a distance that is further than when the container 100 is properly placed to receive a beverage from the valve 202, however, the dispenser 200 is configured such that a threshold signal strength or proximity measurement is required for the valve 202 to dispense the beverage, wherein the threshold strength or proximity measurement is met only when the container 204 is properly located to receive a beverage from valve 202.

In one embodiment, upon receiving the electronic signal from the wireless transceiver 216, the wireless transceiver 106 of the container 100 may transmits a return signal indicating that the container is located in a proper configuration to receive the beverage, such as the placement of the container 100 in relation to valve 202 shown in FIG. 3A. In this regard, the beverage is only dispensed when the container 100 having a wireless transceiver 106 transmitting a valid electronic return signal is correctly placed to receive the beverage.

In one embodiment, the wireless transceiver 106 is configured to transmit information to enable a beverage to be dispensed from a specific valve 202. Yet in other embodiments, the wireless transceiver 106 is configured to enable the dispensing of a beverage from several different valves. In one such embodiment, at least one valve dispenses a fluid that is different than the fluid dispensed from at least one other valve. In another embodiment, the wireless transceivers 106, 216 do not require complex circuitry that requires information to be rewritten with additional information, such as the amount of beverage dispensed, quantity of times the container has been utilized at one or more dispensers 200, or other information. Yet in other embodiments, information, including one or more of the parameters above (and/or other parameters) may be transmitted. Furthermore, in certain embodiments, one or more of the electronic signals transmitted from the wireless transceiver(s) 106, 216 does not include information regarding the purchaser or user of container 100. Yet in other embodiments, such information regarding the purchaser or user of container 100 may be utilized.

In one embodiment, one or more of the electronic signals to be transmitted from container 100 to the transceiver 216 is determined and configured before a consumer purchases the cup. Therefore, in certain embodiments, this would reduce the complexity and time required for transactions related to selling or otherwise providing container 100 to a consumer.

As those skilled in the art will readily appreciate in view of this disclosure, either wireless transceiver 106, 216 may be located at other locations associated with the beverage dispenser 200 and the container 100.

The advantages and benefits of a beverage dispensing system in accordance with this invention may be readily apparent to those of skill in the art. Specifically, one advantage of the beverage dispensing system 10 may be controlled access to premium beverages at a beverage dispensing system. Because of the transmissions between the transceiver 106 on the container 100 and the transceiver 216 on the beverage dispenser 200, the beverage dispenser system 10 may provide controlled access to premium beverages. Another advantage for the beverage dispensing system 10 may be that the RFID/EAS equipped valves and wireless systems are generally more difficult to bypass than systems that utilize mechanical or contact/switch systems as used in the prior art. Additionally, the beverage dispensing system 10 does not require physical contact between the container 100 and the valve 202 to activate the beverage dispenser system 10, thereby making the beverage dispensing system 10 of the present invention easier to use and generally more sanitary.

CONCLUSION

The present invention is disclosed above and in the accompanying drawings with reference to a variety of examples. The purpose served by the disclosure, however, is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

We claim:

1. A beverage dispensing system, comprising:
    a dispensing system housing; and
    a contactless beverage dispenser coupled to the dispensing system housing, the contactless beverage dispenser comprising:
        a valve configured to dispense the beverage;
        a valve housing;
        a lever backing coupled to the valve housing; and
        communications electronics disposed within the contactless beverage dispenser, the communications electronics comprising:
            a wireless transceiver disposed within the lever backing and configured to communicate with a container wireless transceiver of a beverage container; and
            a circuit board disposed within the valve housing.

2. The beverage dispensing system according to claim 1, further comprising the beverage container.

3. The beverage dispensing system according to claim 1, wherein the contactless beverage dispenser is coupled to and extends out from a front side of the dispensing system housing.

4. The beverage dispensing system of claim 1, further comprising a second contactless beverage dispenser disposed horizontally next to the contactless beverage dispenser.

5. The beverage dispensing system of claim 4, wherein the second contactless beverage dispenser comprises:
    a second valve configured to dispense a second beverage; and
    second communications electronics disposed within the second contactless beverage dispenser, the second communications electronics comprising:
        a second wireless transceiver configured to communicate with the container wireless transceiver of the beverage container; and
        a second circuit board.

6. A contactless beverage dispenser configured to couple to a dispensing system housing, the contactless beverage dispenser comprising:
    a valve configured to dispense a beverage;
    a valve housing;
    a lever backing coupled to the valve housing; and
    communications electronics disposed within the contactless beverage dispenser, the communications electronics comprising:
        a wireless transceiver disposed within the lever backing and configured to communicate with a container wireless transceiver of a beverage container; and
        a circuit board disposed within the valve housing;
    wherein the contactless beverage dispenser is configured to dispense the beverage without contact between the beverage container and the contactless beverage dispenser.

7. The contactless beverage dispenser of claim 6, wherein the wireless transceiver is configured to transmit and receive a signal from a container wireless transceiver of the beverage container, and wherein the circuit board is configured to control the operation of the contactless beverage dispenser.

8. The contactless beverage dispenser of claim 7, wherein the communications electronics are configured to determine whether the beverage container is a compatible container.

9. The contactless beverage dispenser of claim 8, wherein the communications electronics are configured to determine whether the beverage container is within a predetermined distance of the valve.

10. The contactless beverage dispenser of claim 8, wherein the valve is configured to dispense the beverage in response to the communications electronics determining that the beverage container is a compatible container.

11. The contactless beverage dispenser of claim 9, further comprising a motion sensor configured to detect motion, wherein the wireless transceiver is configured to transmit an electronic signal in response to the motion sensor detecting motion.

12. A beverage dispensing system, comprising:
    the contactless beverage dispenser of claim 6 coupled to the dispensing system housing;
    a second contactless beverage dispenser coupled to the dispensing system housing.

13. The beverage dispensing system of claim 12, wherein the second contactless beverage dispenser comprises:
    a second valve configured to dispense a second beverage; and
    second communications electronics disposed within the second contactless beverage dispenser, the second communications electronics comprising:
        a second wireless transceiver configured to communicate with the container wireless transceiver of the beverage container; and
        a second circuit board.

* * * * *